July 9, 1935.                    F. E. NICKEL                    2,007,477
RADIO CONTROLLED NAVIGATION APPARATUS
Filed April 6, 1931
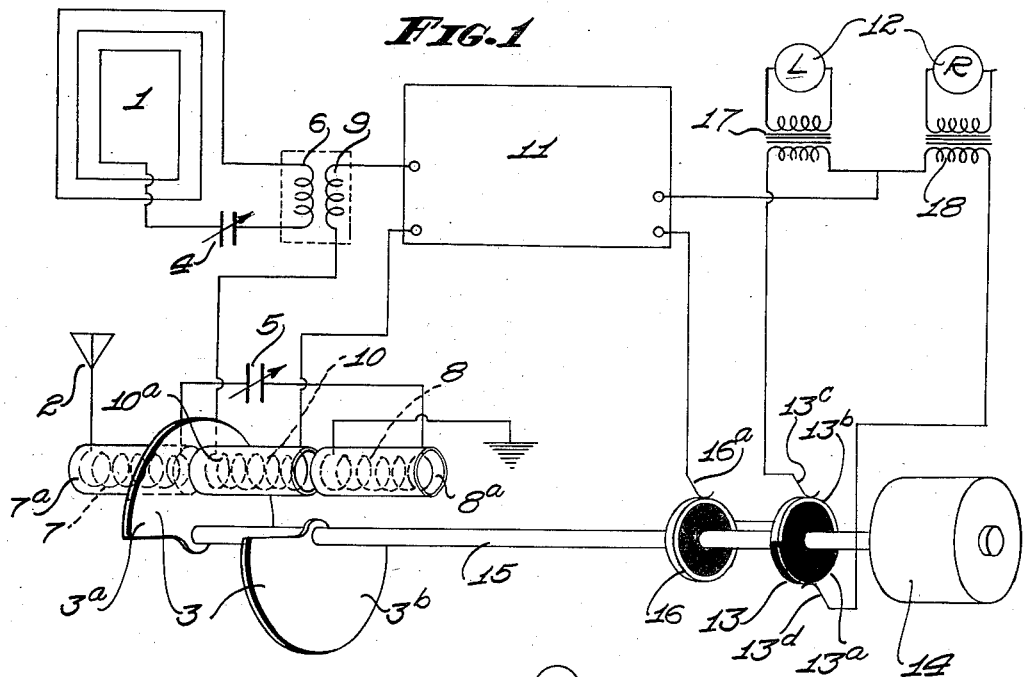
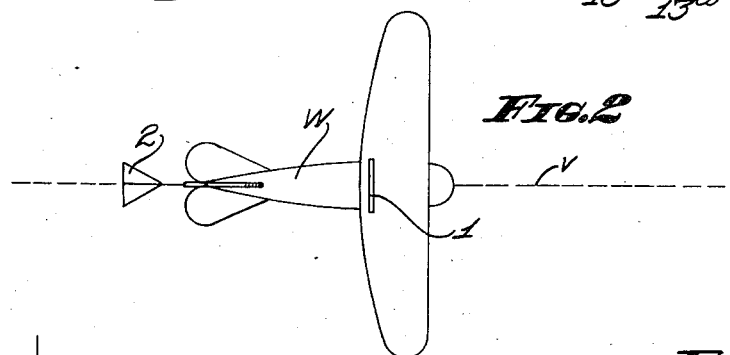
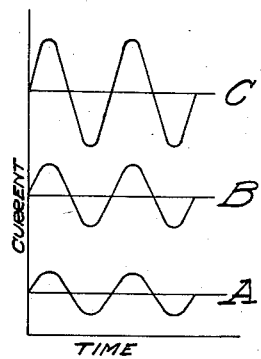
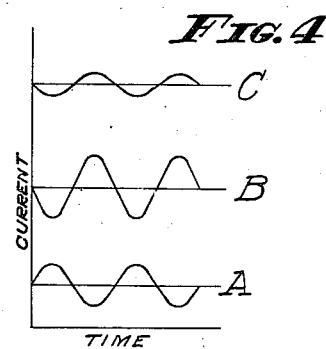
INVENTOR
FREDERICK E. NICKEL
BY
W. B. Bowman
ATTORNEY Patented July 9, 1935

2,007,477

UNITED STATES PATENT OFFICE 2,007,477

RADIO CONTROLLED NAVIGATION APPARATUS

Frederick E. Nickel, San Diego, Calif., assignor of one-fourth to Raymond A. Keirle and one-fourth to William E. Phillips, both of San Diego, Calif.

Application April 6, 1931, Serial No. 527,908

6 Claims. (Cl. 250—11)

My present invention relates to radio controlled navigation apparatus, and is an improvement of the apparatus shown in my copending application for improvement for radio controlled navigation apparatus, Serial No. 506,118.

My device is particularly adapted for the navigation of ships and of aircraft.

The objects of my present invention are:

First, to provide a radio controlled means for use on a craft for ascertaining its direction of movement and its position in conjunction with the known location of radio transmitting stations;

Second, to provide a radio reception device for a craft, which provides luminous visual indications of the fact that the craft is progressing in a direct line with a given transmitting station;

Third, to provide means for indicating visually the direction the craft must be turned in order to align it with the direct line from a given transmitting station;

Fourth, to provide two receiving antennae of such construction that the receptive quality of one will predominate over that of the other at all times that the craft is in alignment with the given radio transmitting station, and receiving means associated therewith adapted to visually indicate such predominance;

Fifth, to provide an apparatus of this class in which the antennae may be placed in a relatively narrow space;

Sixth, to provide an apparatus in which the phase of the current in the radio receiving means is periodically changed or reversed, and particularly in which the phase of the current in the predominating antenna is reversed with respect to that of the other antenna;

Seventh, to provide an apparatus of this class in which the phase of the current in the radio receiving means is periodically changed or reversed without the necessity of opening and closing the antenna circuit;

Eighth, to provide novel means for effecting such reversing of the phase of the current;

Ninth, to provide means in connection with the radio receiving apparatus and the luminous indicating means for alternately electrically connecting the output of the radio receiving apparatus to each of the indicating means, such alternating connecting of the radio receiving apparatus changing simultaneously with the changing of the phase of the current in the radio receiving apparatus; and Tenth, to provide a device of this class which may be equally readily mounted and operated on an aircraft, a land vehicle, a ship, and one which is relatively simple in operation, light in weight, compact in form, and which will not readily deteriorate or get out of order.

With these and other objects in view as will appear hereinafter, my invention consists of certain novel features of construction, combination and arrangement of parts and portions as will be hereinafter described in detail and particularly set forth in the appended claims, reference being had to the accompanying drawing and to the characters of reference thereon which form a part of this application in which:

Figure 1 is a wiring diagram and diagrammatic perspective illustration of my apparatus; Fig. 2 is a diagrammatic view indicating the preferred relationship of the loop antenna to the craft; Fig. 3 is a phase diagram with the reversing and the phase changing apparatus in the position shown in Fig. 1; and, Fig. 4 is a phase diagram with the phase changing apparatus rotated 180° from the position shown in Fig. 1.

Like characters of reference refer to similar parts and portions throughout the views of the drawing.

The antennae 1 and 2, phase alternator 3, variable condensers 4 and 5, primary induction coils 6, 7, and 8, secondary induction coils 9 and 10, radio receiving apparatus 11, steering indicators 12, distributor 13, and driving motor 14, form the principal parts and portions of my apparatus.

In my present invention I provide a loop antenna 1 of the conventional direction finding type comprising a number of turns of wire wound in a common plane, mounted with its plane at right angles to the longitudinal axis or direction of movement of the craft W, the longitudinal movement of the craft being indicated by the dash line $v$ in Fig. 2. The primary induction coil 6 and the secondary induction coil 9 are preferably wound on a common form and are contained in a metal shield, such as aluminum, represented by the dotted lines in Fig. 1. The primary induction coil 6 is connected to the loop antenna 1 with the variable condenser 4 in series therewith, the variable condenser 4 being used to tune the antenna circuit to the transmitting station desired. The antenna 2 is of the conventional single or multiple wire type and is mounted on the craft W in any convenient manner. The primary induction coils 7 and 8 are connected in series with the variable condenser 5 and are in turn connected to the antenna 2 and the ground. The ground may be of any conventional construction. However, when my apparatus is mounted on aircraft it is preferable to use a counter poise in the place of the conventional ground. The induction coils 7 and 8 are contained within tubular shields 7a and 8a, respectively, of a non-magnetic metal, such as aluminum, and are positioned with their longitudinal axis in alignment with each other, and are spaced apart a distance sufficient to permit the induction coil 10, which is also contained within an aluminum shield 10a, to be positioned therebetween with the longitudinal axis of the induction coil 10 in alignment with and coincident with the longitudinal axis of the coils 7 and 8. The induction coils 7 and 8 are so connected in series that the radio frequency current induced into the coil 10 by the coil 8 will be 180° out of phase with that of the current induced in the coil 10 by the coil 7. The antenna 1 with its induction coil 6, and the antenna 2 with its induction coils 7 and 8 are tuned to the same radio frequency signal, that is, the same radio transmitting station by the variable condensers 4 and 5, respectively, so that the radio frequency energy induced in the coil 9 from the antenna 1 and that induced in the coil 10, from the antenna 2 is that of the same transmitting station.

The phase alternator 3 consists of two semicircular non-magnetic metal shields 3a and 3b in the form of flat discs, mounted 180° opposite to each other on a shaft 15 having its longitudinal axis parallel to the longitudinal axis of the coils 7, 8, and 10, and connected to the motor 14. The metal shield 3a is adapted to pass between the coils 7 and 10, while the shield 3b is adapted to pass between the coils 8 and 10, as they are rotated by the motor 14. When such a shield is placed between either the coils 7 and 10, or 8, and 10, inductive coupling between the coils between which the shield is positioned is prevented because the magnetic lines of force, which affect such coupling will not pass therethrough. Thus the purpose of this alternator is to permit the radio frequency currents carried by the coils 7 and 8 to be alternately induced into the coil 10. Since the coils 7 and 8 are so connected together that the current induced in the coil 10 by the coil 8 is 180° out of phase with that induced in the coil 10 by the coil 7, the phase of the current induced in the coil 10 received by the antenna 2 will be reversing periodically at a rate depending upon the rate at which the discs 3a and 3b are rotated.

The secondary coils 9 and 10 are connected in series and are in turn connected to the input of the receiver 11, which may be any sensitive receiver, but in its preferred construction comprises a sensitive multi-stage radio frequency amplifier using screen grid vacuum tubes, a regenerative detector, capable of causing radio frequency oscillations in its associated circuit, and one or more stages of audio frequency amplification, the output of which is connected to the indicating means through the distributor 13. The radio frequency current induced in the coil 9 is that carried by the coil 6 and received by the antenna 1, while the radio frequency current induced in the coil 10 is that carried by the coils 7 and 8, and received by the antenna 2. Thus the coils 9 and 10 will be carrying radio frequency current received from two separate sources, namely, the antennae 1 and 2. Since each of the antennae 1 and 2 is tuned to receive radio frequency energy from the same transmitting station, the frequency of the current induced and carried by the coils 9 and 10 is that of the same station, thus eliminating the occurrence of beat frequencies which would result if the antennae 1 and 2 is each tuned to different transmitting stations of different frequencies. It will be here noted that the phase of the current induced into the coil 10 from the coils 7 and 8 will be alternately in and out of phase with the current induced into the coil 9 by the coil 6. The operation of the device is dependent upon this reversing of the phase of the current induced from one antenna with respect to that of the other antenna as will be hereinafter described.

The output of the receiver 11 is associated with a circuit including the steering indicator 12, which consists of a pair of neon glow lamps, designated L and R, and the distributor 13. The distributor 13 is mounted on the shaft 15 and consists of an insulated disc 13a which is provided around 180° of its circumference with an electrically conductive segment 13b. The distributor 13 is connected to the output of the receiver 11 through a collector ring 16 and the brush 16a which bears upon the collector ring 16. The neon glow lamp, designated L, is connected across the secondary of an audio frequency transformer 17, while the neon glow lamp, designated R, is connected across the secondary of an audio transformer 18. One lead to each of the primaries of the transformers 17 and 18 is connected together and is in turn connected to one of the output terminals of the receiver 11. The remaining terminal of the primary of the transformer 17 connects to a brush 13c which bears against the circumference of the distributor 13. The remaining terminal of the transformer 18 connects to a second brush 13d positioned diametrically opposite to the brush 13c, the brush 13d also bearing upon the circumference of the distributor 13. These brushes are adapted to alternately engage the electrically conductive segments 13b for alternately connecting the transformers 17 and 18 to the output of the receiver 11. The electrically conductive segment 13b is so positioned on the insulation 13a that the changing of the connection of the receiver to the transformers 17 and 18 takes place simultaneously with the reversing of the phase of the current induced in the coil 10. Thus as the phase of the current induced in the coil 10 is reversed, the output current of the receiver 11 is connected to the opposite one of the transformers than it was previously. Referring to Figure 1, it will be noted that when the distributor 13 and the phase alternator 3 are in the position shown, the current induced in the coil 10 is that of the coil 8 at which time the transformer 17 is connected to the output of the receiver 11, and that when the current induced in the coil 10 is that of the coil 7, the transformer 18 is connected to the receiver 11. It will also be noted that the speed of rotation of the shaft carrying the phase alternator 3 and the distributor 13 is relatively high, preferably in the order of 3600 R. P. M. Due to this rapid rotation of the phase alternator 3 and the distributor 13, the lamps 12 will appear to be illuminated continuously and will not appear to flicker although they are alternately illuminated.

Before describing the operation of the device, it is pointed out that when the plane of the loop antenna 1 is at right angles to a line adjoining the antenna and the transmitting station, the radio frequency current in the antenna and associated circuits will be practically zero, and when the plane of the loop is in line or parallel with the line from the transmitting station, the current in the antenna and associated circuits will be at a maximum, and furthermore that the phase of this current when the plane of the loop is rotated in a clockwise position from the position of zero current, that is, when the plane of the loop is perpendicular to the line from the transmitting station, will be 180° opposite to that when the loop is rotated to a counterclockwise position from the position of zero current. In contradistinction to the phase relation of the current supplied by a loop antenna when the antenna is rotated, the phase of the current flowing in the conventional antenna, such as the antenna 2, is independent, as is the strength of the current, of the position of the antenna relative to the transmitting station. In view of the above facts, the operation of the device is as follows:

Consider first that the craft W is progressing directly toward the transmitting station, that is, on a line with the transmitting station, then, as previously pointed out, the current flow in the loop antenna 1 and the coil 6 will be practically zero and all of the radio frequency energy supplied to the receiver 11 will be that of the antenna 2. When the phase alternator 3 and the distributor 13 are in the position shown in Fig. 1, the radio frequency current supplied to the receiver 11 is induced into the coil 10 by the coil 8 and the output of the receiver is connected to the transformer 17. Thus the neon glow lamp L will be illuminated to a certain intensity depending upon the amount of current supplied to the receiver by the coil 10. Now if the phase alternator 3 and distributor 13 are considered to be rotated 180°, the radio frequency current supplied to the receiver 11 is induced into the coil 10 by the coil 7. Thus, the phase of the radio frequency current supplied to the receiver 11 is reversed 180°, but this reversing does not affect the strength of the output current of the receiver. However, the distributor 13 is in such a position that the output of the receiver 11 is now connected to the transformer 18. Thus the neon glow lamp R will be illuminated to the same intensity as the lamp L was previously. Since the lamps L and R are rapidly alternately connected to the receiver, they will appear to be illuminated continuously, and when the craft W is progressing as herein considered, they will be illuminated to equal intensity indicating that the craft is on its course.

Now consider the craft to be turned off to the right of the course, which is in effect rotating the loop antenna 1 clockwise. The loop antenna 1 will be receiving radio frequency current in proportion to the amount it is turned from the position of zero current. The phase of the current will be as represented by the curve A of Figure 3. The antenna 2 will also be receiving radio frequency current from the same transmitting station, and when the alternator 3 is in position shown in Fig. 1, the current of the antenna 2 is induced in the coil 10 by the coil 8. The phase of the current thus induced in the coil 10 will be as represented by curve B of Fig. 3. Since the coil 9 also carries the current of the coil 10 and the coil 10 also carries the current of the coil 9, and since the curves representing the phase of the current flowing through the coils 9 and 10 from the antennae 1 and 2, respectively, are in phase, the current supplied to the receiver 11 is the sum of the currents induced in the coil 9 from the antenna 1 and the current induced in the coil 10 from the antenna 2, as represented by the curve C of Fig. 3. As previously pointed out the output of the receiver is connected to the transformer 17 and the neon glow lamp L will be illuminated to an intensity representing the combined current of the antennae 1 and 2. When the phase alternator 3 and distributor 13 are rotated 180° the phase of the current induced in the coils 9 and 10 by the antenna 1 and the coil 6 and the antenna 2 and coil 7, respectively, will be as represented by the curves A and B, respectively, of Fig. 4. It will be noted that the current induced in the coil 10 from the antenna 2 is such that it opposes the current induced in the coil 9 from the antenna 1, and the current thus supplied to the receiver 11 is the difference of the current induced in the coil 9 from the antenna 1 and that induced in the coil 10 from the antenna 2, as represented by the curve C of Fig. 4. Since the distributor 13 has now connected the output of the receiver 11 to the transformer 18, the lamp R will be illuminated to an intensity representing the difference of the currents of the antennae 1 and 2, which is considerably less than the former illumination of the lamp L. Due to the rapidly alternately connecting of the transformers 17 and 18 to the receiver output, each of the lamps will appear to be illuminated continuously, and the lamp L, which receives the combined current of the antennae 1 and 2, will appear the brighter of the two, indicating that the craft W must be turned to the left to again align it with the transmitting station.

When the craft is turned off to the left of the course, the operation is substantially the same as that described when the craft is turned to the right of the course. In this case the phase of the current induced in the coil 9 from the loop antenna 1 is 180° opposite to that represented by curve A of Fig. 3 so that the additive effect takes place when the alternator 3 is rotated 180° from the position shown in Fig. 1, or when the phase of the current induced in the coil 10 from the antenna 2 is as indicated by curve B of Fig. 4, and in this instance the distributor 13 is in such a position that the additive current is supplied to the transformer 18 which illuminates the neon glow lamp R, while the neon glow lamp L is now illuminated by the current representing the difference of the current of the antennae 1 and 2. Thus the lamp R will now be the brighter of the two which indicates that the craft must be turned to the right to be aligned with the transmitting station.

It is here pointed out that if the craft is progressing away from the transmitting station, the intensity of the illumination of the lamps L and R will be reversed to what they normally should, so that, for example, when the lamp L is the brighter of the two, which would normally indicate that the craft should be turned to the left to again place it on its course, the pilot would automatically turn the craft to the left but in so doing the lamp L would, instead of decreasing in illumination would increase indicating that the craft is further to the left than before and the pilot would therefore know that it is necessary to turn the craft around 180°. This condition takes place because the phase of the current in the loop antenna is 180° opposite to that which it would be were the craft progressing toward the transmitting station. This opposite phase condition causes the additive effect of the current from the two antennae when the distributor 13 is 180° opposite to the position that it would be when the additive effect occurs when the craft is progressing toward the transmitting station, thus supplying the additive current to the wrong lamp.

It is here noted that if it is desired to fly or travel away from the transmitting station, a reversing switch may be placed in the leads from the distributor 13 to the primary of the transformers 17 and 18 so that the relative illumination of the lamps will indicate correctly the direction the craft must be turned to again align it with the transmitting station. Such reversing switch would be marked "Toward" and "Away", indicating that the meter is set to read correctly when flying toward or away from the transmitting station according to the position of the switch.

It will be here noted that the steering indicator lamps 12 may be replaced by the meter shown in my copending application, Serial No. 506,118 for indicating when the craft is on the proper course. However, in replacing the lamps 12 with the meter shown in the copending application it would be necessary to make slight alterations in the distributor 13, and also to provide an additional rectifying means between the output of the receiver 11 and the distributor 13.

The application of my apparatus to a craft is substantially the same as that shown and described in connection with my copending application, Serial No. 506,118, although the operation of the device in my present invention differs from that in my copending application in that in my copending application I employ a meter for indicating when the craft is on its course, and furthermore that the meter indicates zero when the signal strength from the two antennae is equal. In my present invention I employ two neon glow lamps for indicating when the craft is on its course and the illumination of the two glow lamps will be equal when the signal strength of the antenna 2 in effect predominates over that of the antenna 1.

Though I have shown and described a particular construction, combination and arrangement of parts and portions, I do not wish to be limited to this particular construction, combination and arrangement, but desire to include in the scope of my invention, the construction, combination and arrangement substantially as set forth in the appended claims.

Having thus described my invention what I claim as new and desire to secure by Letters Patent is:

1. In a radio navigation apparatus adapted to be carried on craft, a loop antenna and a non-directional antenna and its ground mounted thereon, an inductance means and tuning means in electrical connection with said loop antenna, and a secondary inductance means inductively coupled with the loop antenna inductance means, a pair of inductance coils, and a tuning means in electrical connection with the non-directional antenna, and a secondary inductance coil in inductive coupling relation to each of the pairs of inductance coils, a shield means adapted to pass between each of said pair of inductance coils and the secondary inductance coil, said shield means relatively disposed so as to pass alternately between the respective inductance coils, and means for operating said shield means whereby the phase of the oscillations induced in said secondary inductance coil is reversed with respect to those of the secondary inductance coil associated with said loop antenna.

2. In a radio navigation apparatus adapted to be carried on craft, a loop antenna and a non-directional antenna and its ground mounted thereon, an inductance coil and tuning means in electrical connection with said loop antenna and a secondary inductance coil inductively coupled to the loop antenna inductance coil, said coils being contained within a metal shield, a pair of inductance means each contained within tubular metal shields, and a tuning means in electrical connection with the non-directional antenna, and a secondary inductance means contained within a tubular metal shield and positioned in longitudinal axial alinement with said pair of inductance means for placing said pair of inductance means in inductive coupling relation to said secondary inductance means, and means for alternately shielding each of said inductance means from said secondary inductance means whereby the phase of said secondary inductance means is reversed with respect to said secondary inductance coil.

3. In a radio navigation apparatus adapted to be carried on craft, a loop antenna and a non-directional antenna and its ground mounted thereon, an inductance coil and tuning means in electrical connection with said loop antenna and a secondary inductance coil inductively coupled with the loop antenna inductance coil, said coils being contained within a metal shield, a pair of inductance means each being contained within tubular metal shields, and a tuning means in electrical connection with the non-directional antenna, and a secondary inductance means contained within a tubular metal shield and positioned in longitudinal axial alinement with and between said pair of inductance means for placing said pair of inductance means in inductive coupling relation to said secondary inductance means, substantially semi-circular metal shields rotatably mounted upon a shaft in arcuately offset relation so as to pass alternately between each of said pairs of inductance means and said secondary inductance means whereby the phase of said secondary inductance means is reversed with respect to said secondary inductance coil.

4. In a radio navigation apparatus adapted to be carried on a craft, a pair of radio oscillation collecting circuits, a directional antenna in one of said collecting circuits, a non-directional antenna in the other of said collecting circuits, a radio oscillation receiving means inductively coupled with both of said collecting circuits, and apparatus for reversing the phase of one of said collector circuits with respect to the other comprising, a pair of primary inductance means in one of said collector circuits, a secondary inductance connected with said radio oscillation receiving means and interposed between said primary inductances, and movable shield means arranged to alternately shield said primary inductances from said secondary inductance.

5. In a radio navigation apparatus adapted to be carried on craft, a directional antenna and a non-directional antenna and its ground mounted thereon, a primary inductance coil and tuning means electrically connected with one of said antennae, and a secondary inductance coil inductively connected with said primary inductance coil, said coils being contained within a metal shield, a pair of primary inductance means each contained within a tubular shield, and a tuning means electrically connected with the other antenna, and a secondary inductance means arranged within a tubular shield in longitudinal axial alinement with said pair of primary inductance means, and means adapted to pass between said primary inductance means and said secondary inductance means for alternately shielding and permitting inductance coupling of said primary inductance means with said secondary inductance means whereby the phase of said secondary inductance means is reversed with respect to said secondary inductance coil.

6. In a radio navigation apparatus adapted to be carried on craft, a directional antenna and a non-directional antenna and its ground mounted thereon, a primary inductance coil and tuning means electrically connected with one of said antennae, and a secondary inductance coil inductively connected with said primary inductance coil, said coils being contained within a metal shield, a pair of primary inductance means each contained within a tubular shield, and a tuning means electrically connected with the other antenna, and a secondary inductance means arranged within a tubular shield in longitudinal axial alinement with said pair of primary inductance means, and a substantially semi-circular shield rotatably mounted upon a shaft adapted to pass alternately between said primary inductance means, and a motor for driving said shield whereby the phase of said secondary inductance means is reversed with that of the secondary inductance coil.

FREDERICK E. NICKEL.